United States Patent
Bostley, III et al.

(10) Patent No.: US 9,400,890 B2
(45) Date of Patent: Jul. 26, 2016

(54) METHOD AND DEVICES FOR SELECTIVE RAM SCRAMBLING

(75) Inventors: Phil J. Bostley, III, Boulder, CO (US); Joshua H. Stubbs, Longmont, CO (US); Philip T. Mueller, Jr., Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 13/571,671

(22) Filed: Aug. 10, 2012

(65) Prior Publication Data

US 2014/0047549 A1 Feb. 13, 2014

(51) Int. Cl.
*G06F 21/60* (2013.01)
*G06F 21/62* (2013.01)
*G06F 21/79* (2013.01)

(52) U.S. Cl.
CPC ............... *G06F 21/60* (2013.01); *G06F 21/62* (2013.01); *G06F 21/79* (2013.01)

(58) Field of Classification Search
CPC .......... G06F 21/60; G06F 21/62; G06F 21/79
USPC .......... 726/24, 25, 26, 29; 713/190, 191, 193; 380/37, 44, 45, 200, 210
See application file for complete search history.

(56) References Cited

U.S. PATENT DOCUMENTS

| | | | |
|---|---|---|---|
| 7,036,011 B2 | 4/2006 | Grimes et al. | |
| 7,567,721 B2 | 7/2009 | Alattar et al. | |
| 8,179,983 B2 | 5/2012 | Gordon et al. | |
| 2003/0200451 A1* | 10/2003 | Evans et al. | 713/193 |
| 2006/0048221 A1 | 3/2006 | Morais et al. | |
| 2008/0005590 A1 | 1/2008 | Kasahara et al. | |
| 2008/0162947 A1* | 7/2008 | Holtzman | G06F 21/79 713/193 |
| 2009/0292930 A1 | 11/2009 | Marano et al. | |
| 2012/0159183 A1* | 6/2012 | Adams et al. | 713/189 |
| 2012/0266255 A1* | 10/2012 | Gupta et al. | 726/26 |

OTHER PUBLICATIONS

International Search Report and Written Opinion—PCT/US2013/045681—ISA/EPO—Aug. 30, 2013.

* cited by examiner

*Primary Examiner* — Brandon Hoffman
*Assistant Examiner* — Nega Woldemariam
(74) *Attorney, Agent, or Firm* — Won Tae C. Kim (57) ABSTRACT

A method for selectively scrambling data within a memory associated with a computing device based on data tagging. The computing device may define security domains that are protected. Data generated by an application may be packaged as a data bus transaction having tagging information describing the application and/or the data. The data bus transaction may be transmitted over a bus of the computing device to a memory, such as internal memory, where the computing device may compare the tagging information to stored information describing security domains. When the data is determined to be protected based on the tagging information, the computing device may perform scrambling operations on the data. In an aspect, the tagging information may describe a virtual machine used to execute various applications on a processor. In another aspect, the tagging information may define destination memory addresses or content protection bit values.

47 Claims, 7 Drawing Sheets

METHOD AND DEVICES FOR SELECTIVE RAM SCRAMBLING

BACKGROUND

The providers of protected data, such as Digital Rights Management (DRM) content (e.g., movies, music, and games), have increasing demands for additional measures to ensure the security of their valuable content. Providers of such protected data often require computing devices that access the content (e.g., personal computers, mobile devices, and set-top display units) to employ encryption or scrambling protection tactics within their volatile memory, such as random access memory (RAM). This is known as RAM scrambling. Providers currently require the execution of RAM (or memory) scrambling algorithms in which the memory controller scrambles data prior to sending it to/storing it in internal memory. Obscuring protected data stored within RAM, rather than storing the content in the clear, protects the content from attacks that access internal memory contents.

Because RAM scrambling algorithms use simpler encryption techniques for performance reasons, RAM scrambling is typically less secure than the more complex encryption techniques used with non-volatile storage and transmission. More complex encryption techniques, such as AES encryption, may not be feasible for RAM scrambling in many computing devices accessing protected content, as these techniques require more time to encode/decode and are resource-intensive. RAM scrambling uses a simpler algorithmic structure and smaller keys to minimize the impact on memory performance. However, the lower complexity of scrambling techniques could permit attackers to conduct brute force attacks by repeatedly inserting known data into internal memory storing protected content to determine what addresses of the memory are associated with the inserted known data. By ascertaining scrambled results from such pattern matching attacks, nefarious applications may reverse engineer the key and algorithm of a RAM scrambling implementation and gain unfettered access to protected data, such as DRM content.

SUMMARY

The various embodiments provide methods and devices that selectively scramble data for storage in memory of electronic devices that provides improved security for data including protected content. Embodiment methods for selective memory scrambling within a computing device to efficiently protect data from pattern matching attacks included determining whether data to be stored in a memory includes protected content, applying a scrambling routine to the data as part of storing the data in the memory when the data includes protected content, and storing the data in the memory without applying the scrambling routine to the data when the data does not include protected content. The protected content may be data under digital rights management (DRM), personal information, security information, banking information, passwords, authentication information, protected content application information, and medical data. The memory may be cache memory, volatile memory, non-volatile memory, and off-chip storage. In an embodiment, determining whether the data to be stored in a memory includes protected content may include adding tagging information to data transmitted over a bus of the computing device identifying a source or content of the data, and determining the source or content of the transaction based on the tagging information, and applying a scrambling routine to the data as part of storing the data in the memory when the data includes protected content may include scrambling and storing the data in the memory based on the determined source or content. In an embodiment, tagging data transmitted over a bus of the computing device with information identifying a source or content of the data may include adding information to the data correlated to a security domain in which the data may be stored, and determining the source or content of the transaction based on the tagging information may include comparing the tagging information to stored identifiers correlated to authorized security domains. In various embodiments, the tagging information added to the data may be a virtual machine identification (VMID), a bus master identification, a destination storage address, an identifier of a source or content of the data, and/or a content protection (CP) bit.

Other embodiments include a computing device having a memory configured with at least a secure domain in which data is scrambled and an unsecure domain, and a processor coupled to the memory, in which the processor is configured with processor executable instructions to perform operations of the methods described above. In an embodiment, the processor may be one or more of stand alone processor, one of a plurality of processors within the computing device, a coprocessor within the computing device, and a peer processor within the computing device.

Other embodiments include a computing device having means for performing functions of the methods described above.

Other embodiments include non-transitory processor-readable storage medium having stored thereon processor-executable instructions configured to cause a processor to perform operations of the methods described above. In an embodiment, the processor-executable instructions stored on the non-transitory processor-readable storage medium are configured to be executed by a processor selected from the group of one of a plurality of processors, a coprocessor, and a peer processor.

Other embodiments include computing devices including a memory configured with at least a secure domain in which data is scrambled and an unsecure domain, a memory controller couple to the memory, and a processor coupled to the memory and the memory controller, in which the processor is configured with processor executable instructions to perform operations including adding tagging information to data transmitted over a bus of the computing device, and programming the memory controller to perform operations including determining whether data to be stored in the memory includes protected content based on the tagging information, applying a scrambling routine to the data as part of storing the data in the secure domain in the memory when the data includes protected content, and storing the data in the unsecure domain without applying the scrambling routine to the data when the data does not include protected content. The protected content may be data under digital rights management (DRM), personal information, security information, banking information, passwords, authentication information, protected content application information, and medical data. The memory may be cache memory, volatile memory, non-volatile memory, and off-chip storage. In an embodiment, the processor may be configured with processor executable instructions to perform operations such that adding tagging information to data transmitted over a bus of the computing device may include adding information to the data correlated to a security domain in which the data may be stored, and determining whether data to be stored in the memory includes protected content based on the tagging information may include comparing the tagging information to stored identifiers correlated to authorized security domains. The tagging information added to the data may be a virtual machine identification (VMID), a bus master identification, a destination storage address, an identifier of a source or content of the data, and/or a content protection (CP) bit. Other embodiments include a non-transitory storage medium having stored thereon processor-executable instructions configured to cause the processor of such a computing device to perform the foregoing operations.

Other embodiments include a computing device including means for adding tagging information to data transmitted over a bus of the computing device, and means for programming a memory controller to perform operations including determining whether data to be stored in a memory includes protected content based on the tagging information, applying a scrambling routine to the data as part of storing the data in a secure domain in the memory when the data includes protected content, and storing the data in an unsecure domain without applying the scrambling routine to the data when the data does not include protected content. In an embodiment, the means for adding tagging information to data transmitted over a bus of the computing device may include means for adding information to the data correlated to a security domain in which the data may be stored, and determining whether data to be stored in the memory includes protected content based on the tagging information may include comparing the tagging information to stored identifiers correlated to authorized security domains.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of cellular telephones, smart phones, personal or mobile multi-media players, personal data assistants (PDA's), laptop computers, desktop computers, tablet computers, smart books, palm-top computers, wireless electronic mail receivers, multimedia Internet enabled cellular telephones, televisions, smart TVs, smart TV set-top buddy boxes, integrated smart TVs, streaming media players, smart cable boxes, set-top boxes, digital video recorders (DVR), digital media players, and similar personal electronic devices which include a programmable processor, memory, and circuitry at least capable of sending and/or receiving wireless and/or wired data transmissions, accessing local or remote database structures, and performing various calculations.

The various aspects solve the problem of the decreased security of lower complexity random access memory (RAM) scrambling techniques by employing differential (or selective) scrambling of protected data with the scrambling based on transaction tagging. In general, applications may be loaded and registered within an operating system executing on a computing device. The operating system or a memory controller may establish security domains and associate known applications with particular domains. The operating system, memory controller, or other unit controlling access to memory may utilize permission sets that define how applications may access (e.g., store) data within the computing device. For example, an application may not be allowed to access a certain security domain that corresponds to a certain area within a local memory, such as double data rate (DDR) memory. In an aspect, the computing device may execute a top-level routine within the operating system, a "hypervisor," that manages security domains within the computing device. Based on defined permissions of the registered applications, the hypervisor may direct or configure memory controllers to process/store data related to the various applications to provide RAM scrambling for protected data but not for other data. The hypervisor may access information that describes the content, permissions, and registered applications for all security domains as part of making this determination. For example, the hypervisor may access a data table that associates identifying information or codes for various applications with particular security domains.

In an alternative aspect, security domains may be managed by other routines or client software distinct from the hypervisor. For example, a firewall manager routine, separate from an operating system's hypervisor, may manage security domains. In such a case, the hypervisor may be locked out of accessing security domain hardware and may not be certified as trusted code. Additionally, security domain management may be performed by hardware, such as a memory controller or another storage unit controller.

During execution by a processor of the computing device, applications may conduct information transactions over a data bus. In various aspects, the bus may include internal buses (e.g., system, data, etc.) and/or external buses (e.g., serial buses) that create physical connections between the various components of the computing device. Bus controllers (or bus masters) may manage information transactions traveling over the bus. For purposes of describing the various aspects, such information transactions conducted over a data bus are referred to as "data bus transactions." The bus masters may provide the data bus transactions with indicators (i.e., tags or tagging information) of the source application and/or characteristics of the information transmitted. In an aspect, the bus masters may tag data bus transactions that include protected content, such as data bus transactions by applications receiving DRM content from a communication link or non-volatile storage. Bus controllers may apply tagging information indicating a virtual machine ID (VMIDs) used to execute the application and generate the data being carried over the bus. Alternatively, the tagging information may identity the bus master (i.e., the bus ID) that applied the tagging information to a data bus transaction or other identification codes that enable the computing device to distinguish operating partitions between applications. In an aspect, the VMIDs may represent sets of bus master IDs. In an aspect, the bus controllers may also apply particular tags to data bus transactions containing DRM content from applications authorized to process DRM content data. For example, the bus controller may tag data bus transactions from a DRM media-reading application by setting a data bit that indicates the presence of protected content.

The tagged data bus transactions may be directed towards various destination components within or associated with the computing device. Primarily, data bus transactions may be transmitted to and received at internal memory units, such as RAM. However, in the various aspects, data bus transactions may be transmitted to and scrambled within internal memory units and/or any off-chip memory, including remote storage or memory units connected to the computing device through PCI Express, PCI Express mobile, or any other wire protocol.

When the tagged data bus transactions arrive at the destination component, such as an internal memory, the hypervisor software may use the data bus transactions' tagging information to determine the associated security domain for the application initiating the data bus transaction. For example, transactions generated by an application associated with a certain security domain may be tagged with a particular VMID. Based on the determined security domain association, the hypervisor may dictate to various component controllers, such as the controller for a RAM unit, how data received by the component controllers may be handled. Particularly, the hypervisor may instruct memory controllers whether the memory controller should execute a RAM scrambling algorithm to encrypt the data generated by an application. For example, the hypervisor may direct a DDR memory controller to scramble and store received data based on its tagged VMID. In an aspect, a security domain may be associated with a set of multiple VMIDs, bus IDs, and/or memory address ranges.

As data is scrambled by a memory controller only when it relates to protected security domains (e.g., generated by VMIDs associated with protected content security domains), the computing device may use the tagging information to avoid scrambling all data stored in memory units including data sent to RAM from applications that do not require data protection. This enables the computing device to neutralize pattern matching attacks, to use less complex encryption schemes for RAM scrambling, and to only apply encryption operations to protected content data.

In an aspect, the computing device may perform selective memory scrambling based on the destination memory addresses. Data bus transactions generated by an application may be directed for storage within particular ranges of memory addresses (e.g., certain physical addresses within a memory unit). If the computing device identifies the destination memory address of a data bus transaction as relating to a predefined 'protected' area of memory, the computing device may direct the memory controller to scramble the data as part of the storage process.

In an aspect, the computing device, via a memory controller, may scramble bus transaction data based on values of custom bits included within or associated with the data bus transaction. For example, the bus master for a particular device may utilize one or more bits in each transmitted data bus transaction to define the quality, nature, or contents of data bus transactions for purposes of controlling whether it is subjected to RAM scrambling. If the custom bit, or content protection (CP) bit, indicates the data bus transaction includes protected content, the computing device (e.g., the memory controller) may scramble the data as part of the data storing process.

In an aspect, a memory controller may store and directly access data defining security domains. For example, a DDR controller may compare tagging information within a received data bus transaction to a data table maintained by (or programmed into) the DDR controller. Thus, the memory controller may determine whether a data bus transaction contains protected data without direction or input from a hypervisor routine or similar software associated with the computing device's operating system.

In the various aspects, the computing device may interchangeably utilize data tables, database elements, hard-coded definitions, operating system calls, and any other mechanisms for referencing information to define data bus transaction characteristics (e.g., transaction identity, protection classifications, etc.), identify associated security domains, and/or identify the application generating data bus transactions. The descriptions of the computing device's using data tables for classifying data is provided as a non-limiting example of how the computing device processor or bus controllers may classify, identify, or reference data for purposes of selective RAM scrambling. For example, to identify the nature of data within a data bus transaction, the computing device, via the hypervisor, may determine the nature of a data bus transaction based on operating system calls or computing device elements used to transmit the data bus transaction to a memory.

In various aspects, software or components that configure hardware and set policies for executing scrambling operations (e.g., define applications associated with various security domains, etc.) may not scramble data within memory. For example, the hypervisor, firewall manager, or other software associated with the computing device may evaluate tagging information associated with data bus transactions but not scramble the associated data in memory. Additionally, bus controllers may not scramble data within memory, but may only append tagging information and otherwise direct data bus transactions to various components within the computing device, such as the memory controller. In general, scrambling operations and algorithms may be performed by memory controllers exclusively.

In the various aspects, the computing device may further increase the security of RAM scrambling by rotating encryption (or scrambling) keys. Memory scrambling algorithms performed by the computing device may utilize encryption, secret, or encoding keys known only to protected or trusted elements of the computing device. For example, the memory controller unit and the hypervisor may share a secret encryption key used to scramble and de-scramble content stored within and retrieved from memory. In addition to the RAM scrambling methods described herein (e.g., methods based on virtual machine identification, destination memory address, and/or content protection bit information), the computing device may rotate (or modify) encryption keys on a predefined schedule or frequency. By regularly rotating the secret encryption keys, the computing device may further guard against nefarious applications that attempt to use spoofed credentials to gain inappropriate access to data stored in the computing device.

In an aspect, protected content may also include operational or program instructions for applications that access, alter, or otherwise handle protected content data (i.e., protected content application information). For example, information regarding a DRM-content rendering application, including the application's code or instructions, may be stored within memory as protected content.

Figure 1A:
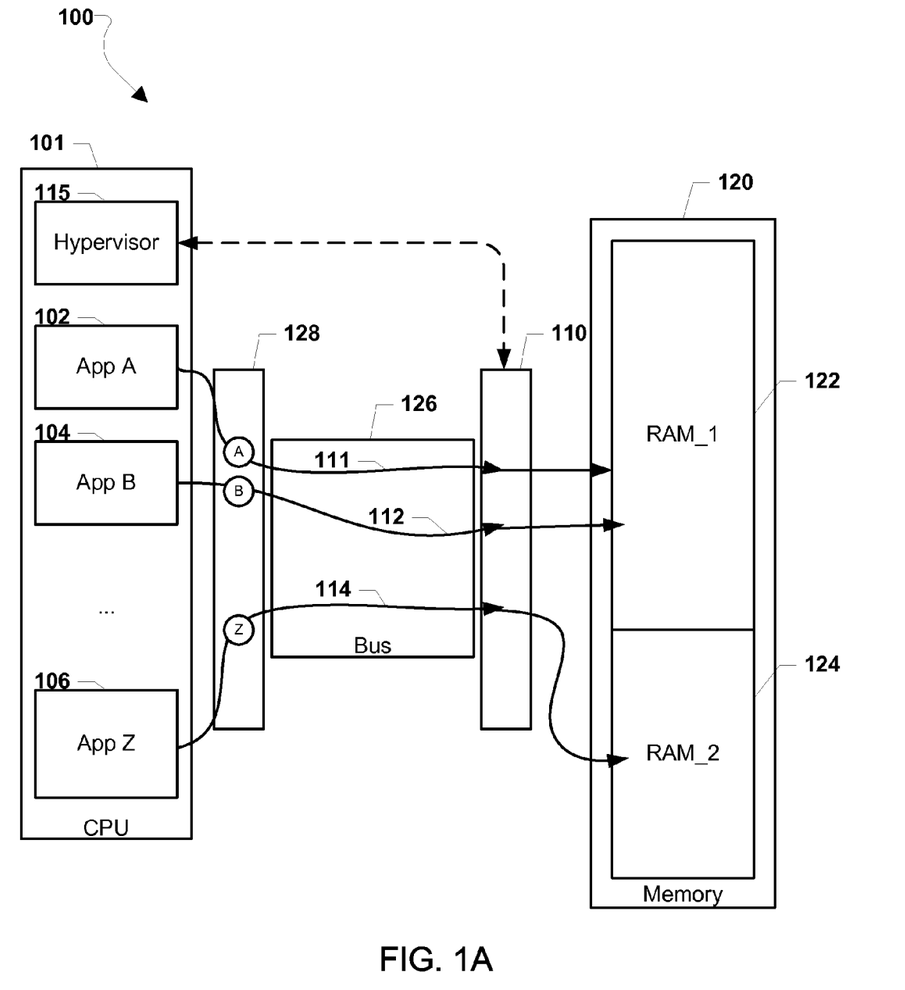
FIG. 1A is a communication system block diagram of various computing device components delivering protected data suitable for use with the various aspects.

FIG. 1A illustrates a flow of data bus transactions within a computing device 100. A processor or central processor unit (CPU) 101 of a computing device may execute numerous software applications and store application data within application memory or cache storage. For example, the CPU 101 may simultaneously execute installed applications App Z 106, App B 104, App A 102, as well as an operating system software that includes a hypervisor 115 routine. The applications 102, 104, and 106 may perform various functions within the computing device 100, such as enabling Internet browsing, communicating with remote data servers, and rendering audio data stored locally on a hard drive. During execution on the CPU 101, the applications 102, 104, and 106 may generate data bus transactions 111, 112, 114. For example, the App A may be an Internet browser application that generates configuration data (e.g., cookie information) to be stored temporarily in the internal memory 120. The CPU 101 may direct the data bus transactions 111, 112, 114 across the bus 126 to internal memory 120. In an aspect, the data bus transactions 111, 112, 114 may alternatively be sent to various off-chip memory units, such as a remote DDR via a wire protocol (e.g., PCI Express, PCI Express Mobile).

The bus controller 128 may tag each data bus transaction 111, 112, 114 with identifying information. As described above, such tagging information may include indicators describing the application producing the data bus transaction (e.g., VMID), bus controller 128 identifying information, characteristics of the content within the data bus transactions, and information related to destination memory addresses. The data bus transactions 111, 112, 114 may travel across the bus 126 and may be processed by a memory controller unit 110. For example, the memory controller unit 110 may scramble data within the data bus transaction 114.

The memory controller 110 may communicate data bus transaction tagging information to and receive response instructions from the hypervisor 115 routine. Upon receipt of data bus transaction tagging information, the hypervisor 115 may evaluate the tagging information (e.g., VMID) of each data bus transaction 111, 112, 114. In an aspect, the hypervisor routine 115 may compare each data bus transaction's tag to a security domain data table, as described below with reference to FIG. 1B, and direct the memory controller 110 to process the data bus transactions 111, 112, 114 for storage according to rules appropriate for each tag obtained from the table. For example, based on the tagging information, the hypervisor 115 may instruct the memory controller 110 to direct data bus transactions 111, 112 from non-protected content applications 102, 104 to a portion of memory 122 that is not scrambled. However, based on the security domain associated with the tagging information identifying App Z 106, the related data bus transaction 114 may be directed to the scrambled portion of the internal memory 124. In other words, the data bus transaction 114 may be identified as coming from the protected content application 106 and thus may be scrambled and saved to the secure portion of the RAM 124. In an aspect, RAM scrambling (or scrambled data) may be limited to a particular segment or partition of memory.

Accordingly, the process of directing data to memory based on tagging information may send non-protected content application data to the unscrambled segment/partition. In this manner, non-protected content applications, or applications without authorization to store protected content, (e.g., malware) may only access portions of memory that are not subject to RAM scrambling and not protected.

Figure 1B:
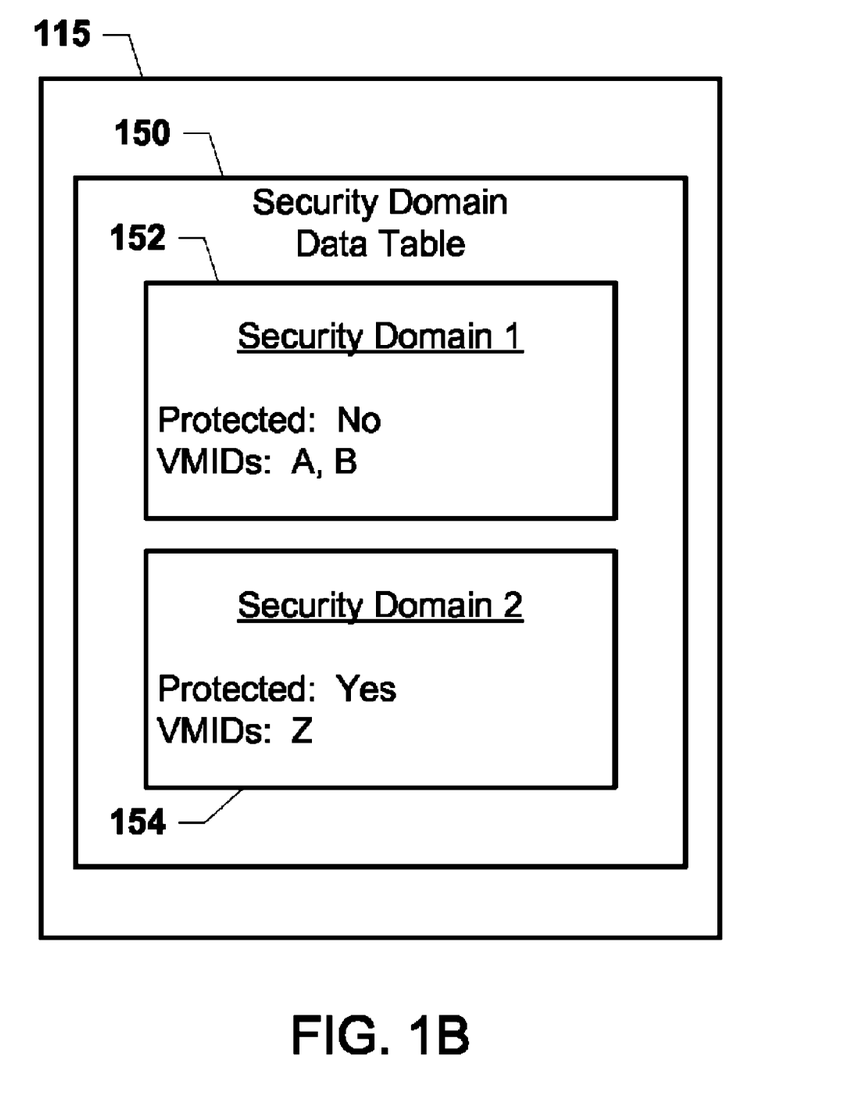
FIG. 1B is a component block diagram of an example data table describing security domains and accessible by a hypervisor operating system routine.

FIG. 1B illustrates a simplified aspect security domain data table 150 utilized by a hypervisor 115 routine executing within a computing device 100. As described above, the hypervisor 115 may process tagging information associated with a data bus transaction based on comparisons with the security domain data table 150. The security domain data table 150 may describe the various security domains supported by the computing device, containing records 152, 154 for each security domain. The records 152, 154 may store application identification information for the applications associated with the various domains. For example, the record 154 for a certain security domain may include information indicating that an application having a certain VMID is associated with the domain. In an aspect, the security domain data table 150 may contain records that indicate addresses within memory units, bus controller identifications, and/or specialized bit values (e.g., CP bit) that are associated with the applications of the various security domains. In another aspect, the hypervisor 115 may configure a memory controller, such as described above with reference to FIG. 1A, and/or store the security domain data table 150 such that the memory controller may utilize the security domain data table 150 using hardware (HW) lookup operations.

Figure 2:
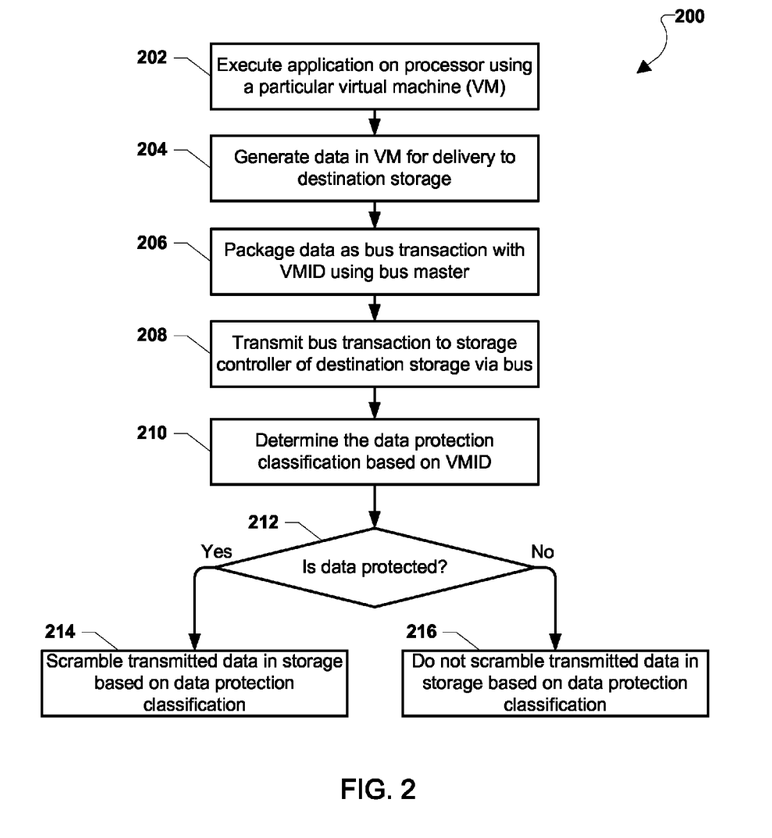
FIG. 2 is a process flow diagram illustrating an aspect method for scrambling protected content within a memory based on virtual machine identification information.

FIG. 2 illustrates an aspect method 200 for processing and scrambling protected data within data bus transactions based on virtual machine ID information. Virtual machines are well known in the art and may generally be defined as software configured to establish certain execution environments (e.g., an emulated system) with which virtual machines may execute other applications. A computing device, via its operating system and/or hypervisor routine, may assign unique identifying codes, or VMIDs, to virtual machines executing on the computing device. The VMIDs may be stored in system data and may be associated with security domains, as described above. In an aspect, the computing device may store and use VMIDs for virtual machines executing on a single processor within the computing device, on a coprocessor (or peer processor) within the computing device, or on a combination of various processors within the computing device.

In block 202, a virtual machine executing on a computing device may execute an application. For example, the virtual machine may emulate a particular hardware configuration and execute an audio data-editing application. As another example, the virtual machine may reserve resources from the computing device and execute the application using the reserved resources. The virtual machine may execute multiple individual applications having common operating parameters or functional characteristics. For example, the virtual machine may execute several applications designed for execution on hardware dissimilar to the computing device (e.g., applications ported for execution on non-native computer architecture). In an aspect, the computing device may execute multiple virtual machines concurrently.

In block 204, the virtual machine may generate data based on the execution of the application. For example, the application executed by the virtual machine may calculate values to be stored within a system data structure. As another example, a video player application may generate DRM video data. The virtual machine may process the generated data and direct the data to be transmitted across the bus to a destination memory. In block 206, the bus master (or controller) may receive and package the generated data as a data bus transaction such that the transaction includes tagging information indicating the virtual machine's VMID. For example, the bus master may tag the data bus transaction (such as by adding information to the data) with a code representing the virtual machine executing a video player application. In another aspect, the bus master may tag the data bus transaction with added information, such as a bus master identification (ID), a timestamp, application memory information, user information, or any other descriptive data.

In block 208, based on destination information provided by the virtual machine, the bus master may transmit the data bus transaction over the bus to a controller unit associated with the destination memory. For example, the data bus transaction may be directed to a controller for a local DDR memory unit.

In block 210, the computing device may determine the nature, or protection classification, of the data bus transaction's data based on the VMID within the data bus transaction's tagging information. In an aspect, the protection classification may define bus transaction data as either 'protected' or 'non-protected.' For example, data having a 'protected' protection classification may include DRM-content, such as copyrighted media, secure information (e.g., banking information), personal information, security information, banking information, passwords, authentication information, and medical data, as well as other data associated with a restricted use contract. In an aspect, the memory controller may communicate the tagging information to a hypervisor routine to determine the protection classification of the transmitted data bus transaction. In an alternative aspect, the hypervisor may directly extract tagging information from the data bus transaction.

In an aspect, the hypervisor may identify the virtual machine's VMID within the tagging information and compare the VMID to a data table describing security domains, as described above. In other words, the data table may contain multiple security domain entries which together may include references to applications or virtual machines executed on the computing device. The hypervisor may find a security domain entry in the data table that is associated with the VMID (e.g., the entry contains a reference to the VMID), and determine the protection classification of the data bus transaction based on data protection information within that security domain entry. For example, the hypervisor may determine a 'non-protected' protection classification when finding the VMID referenced in a 'non-protected' security domain entry. As another example, the protection classification of a security domain associated with a video application streaming DRM content may be 'protected.'

In an alternative aspect, the hypervisor may program the memory controller 110 to identify the virtual machine's VMID within the tagging information and compare the VMID to a data table describing security domains, as described above. In other words, the data table may contain multiple security domain entries which together may include references to applications or virtual machines executed on the computing device. The memory controller 110 may find a security domain entry in the data table that is associated with the VMID (e.g., the entry contains a reference to the VMID), and determine the protection classification of the data bus transaction based on data protection information within that security domain entry. For example, the memory controller 110 may determine a 'non-protected' protection classification when finding the VMID referenced in a 'non-protected' security domain entry. As another example, the protection classification of a security domain associated with a video application streaming DRM content may be 'protected.'

In an aspect, if the VMID is not within the data table (or other reference knowledge base accessing to the computing device), the hypervisor may determine the protection classification of the data bus transaction as non-protected content. In an aspect, the data table may include information that is hard-coded as an element of the operating system of the computing device, supplied by content providers, and/or updated during the execution of various applications on the computing device. For example, the data table may contain default data protection information for applications that are modified when the computing device determines the content associated with applications is DRM, from a particular content provider, or associated in any way with protected data.

In an alternative aspect, if the VMID is not within the data table (or other reference knowledge base accessing to the computing device), the memory controller 110 may determine the protection classification of the data bus transaction as non-protected content. In an aspect, the data table may include information that is hard-coded as an element of the operating system of the computing device, supplied by content providers, and/or updated during the execution of various applications on the computing device. For example, the data table may contain default data protection information for applications that are modified when the computing device determines the content associated with applications is DRM, from a particular content provider, or associated in any way with protected data.

In determination block 212, the computing device may determine whether the bus transaction data is protected based on the determined protection classification. If the data is protected (i.e., determination block 212="Yes"), in block 214 the memory controller may scramble the data transmitted within the data bus transaction by executing a memory scrambling routine or algorithm. Various memory or RAM scrambling algorithms that may be used in the various aspects are well known in the art. On the other hand, if the data is not protected (i.e., determination block 212="No"), in block 216 the memory controller may store the bus transaction data unprotected within the memory as unscrambled data (i.e., not execute a memory scrambling algorithm as part of storing the data).

In an aspect, the tagging information added to the data in a data bus transaction may include the VMID and an additional code (e.g., an application ID or code) that the hypervisor may use to instruct a RAM scrambling algorithm. For example, the hypervisor may determine that the VMID is associated with a security domain generally regarding protected data. However, the application ID may indicate that the application does not require the data to be scrambled. Based on the application ID, the hypervisor may direct the memory controller to not scramble the bus transaction data. In an aspect, the data table defining security domains may include general protection classifications for each virtual machine (or VMID) and exceptional protection classifications for the applications executed by each virtual machine.

Figure 3:
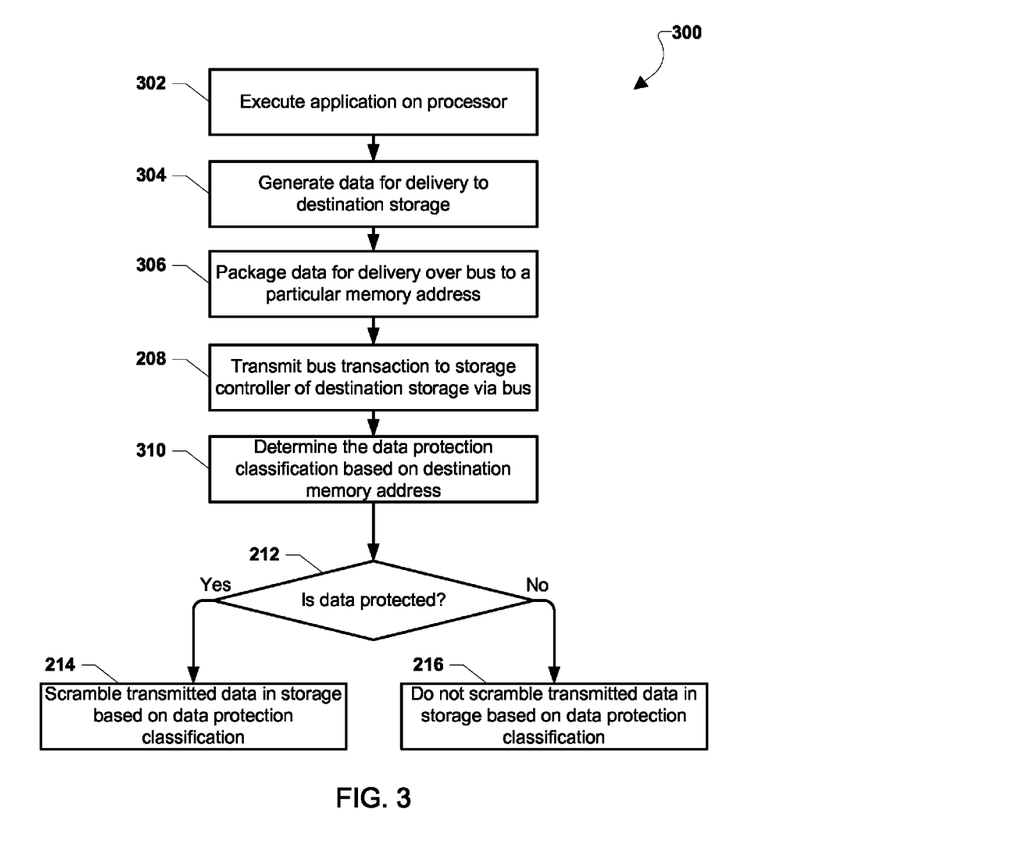
FIG. 3 is a process flow diagram illustrating an aspect method for scrambling protected content within a memory based on a destination memory addresses.

FIG. 3 illustrates an aspect method 300 for processing and scrambling protected data within a data bus transaction based on destination memory addresses. Certain memory addresses of a memory may be protected and only accessible by authorized applications. For example, an application authorized by the computing device (e.g., referenced in a protected content security domain entry) may write data within a protected memory address range. As another example, the computing device may prohibit a nefarious or unrecognized application from directing data to be stored within a protected memory location. Data stored within a protected range of memory addresses may be scrambled by a memory controller associated with the memory. In the various aspects, destination memory addresses may be specific areas of a memory and may be defined by physical memory addresses or virtual memory addresses. In an aspect, the computing device may partition the memory or storage unit and indicate that a certain partition, block, or region is to be used for protected data storage.

In an aspect, the computing device may determine whether an application is authorized to access and/or store data in a protected memory address or location based on information stored in a data table defining security domains that each application is authorized to access. Such a data table may include information correlating applications installed on the computing device, data tags, and security domains that applications are authorized to access and store data. Such a data table correlating applications, data identifiers, and security domains may facilitate determining the source or content of data by using information in the data (i.e., a data tag) as a look up value in a table look up routine to identify the source or content corresponding to the data tag. In a similar manner, the data tag for identifying the source or content of data generated by an application may be determined by using the application name or identifier as a look up value in a table look up routine to identify the corresponding data tag. Also, the computing device may identify an authorized security domain for storing data by using the information in the data (i.e., data tag) as a look up value in a table look up routine to identify the security domain corresponding to the data tag.

An application may be associated with a security domain that is not related to protected data, and thus may not be authorized to access a protected memory location. If the computing device determines that an unauthorized application is requesting storage of data within a protected memory location, the computing device may store the data within unprotected memory. Alternatively, the computing device may perform application identity confirmation operations by prompting the application to signal identifying information or re-transmit the data bus transaction. In an aspect, the computing device may disregard data bus transactions requesting protected memory without authorization.

In block 302, the computing device may execute an application, such as a DRM-content rendering program. The application may or may not be executed by a virtual machine. In block 304, the application may generate data for delivery over the system bus. The application may indicate to a bus controller that the generated data should be stored within a particular destination storage address in the memory. For example, the application may indicate to the bus controller that the generated data should be directed to a particular physical address range of the memory. In block 306, the bus controller may package the data as a data bus transaction that includes tagging information that indicates, at least, the destination memory address. In block 208, the bus controller may transmit the data bus transaction to the memory at which the transaction is received by the memory controller.

In block 310, similar to as described above with reference to the operations of block 210, the computing device may determine the protection classification of the information within the data bus transaction based on the destination memory addresses. The memory controller may identify the destination memory addresses within the data bus transaction information and analyze the addresses to determine whether the data bus transaction relates to protected content. In an aspect, the memory controller, such as a DDR controller, may be programmed with the protected addresses of the memory.

In another aspect, the memory controller may access a data table defining the memory addresses relating to protected and unprotected data. For example, the data table may contain an entry indicating all memory addresses that correspond to the protected data classification. Alternatively, the data table may contain entries for all security domains of the system, and the computing device may locate the data bus transaction destination memory addresses within the various security domain entries. Based on the characteristics of the security domain associated with the destination memory addresses, the computing device may determine the protection classification of the data bus transaction.

In determination block 212, the computing device may determine whether the data bus transaction's protection classification indicates that the data should be scrambled. If the bus transaction data is protected (i.e., determination block 212="Yes"), in block 214 the computing device, via the memory controller, may scramble the data and store it within the destination memory addresses predetermined as protected locations. However, if the bus transaction data is not protected (i.e., determination block 212="No"), in block 216 the computing device may store the bus transaction data within the destination memory addresses without performing any scrambling operations. In other words, when the data bus transaction contains data for storage within an unprotected destination memory address, the data may be stored in the clear.

Figure 4:
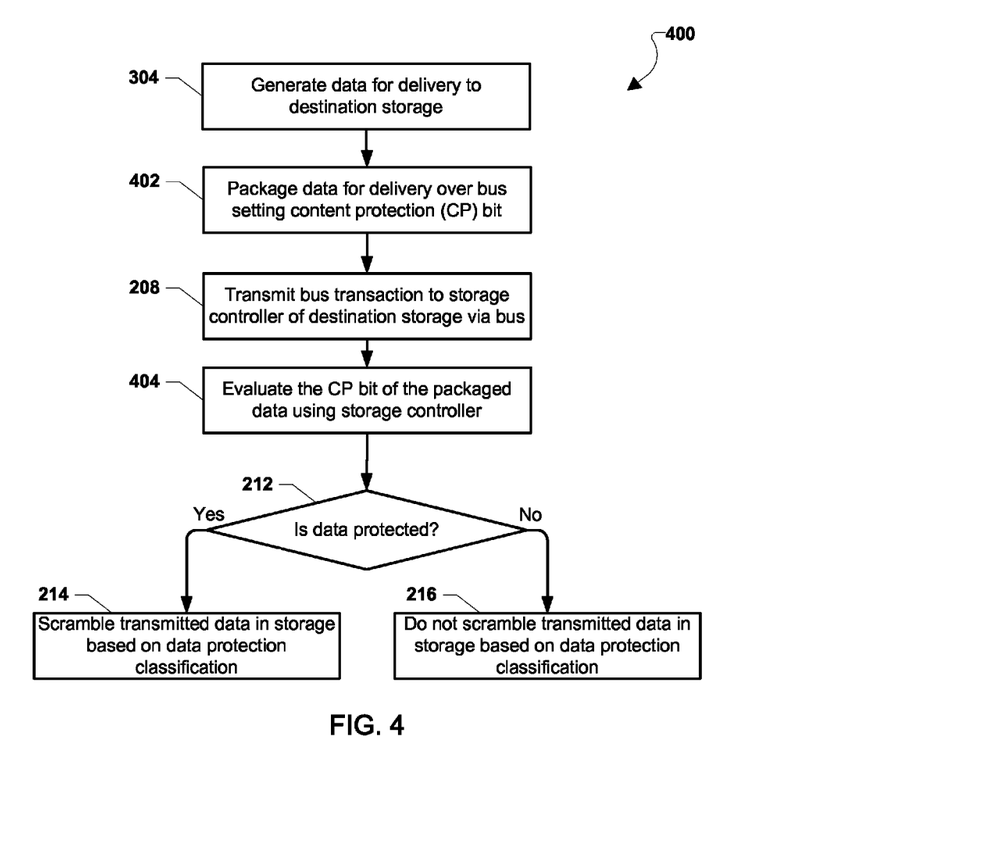
FIG. 4 is a process flow diagram illustrating an aspect method for scrambling protected content within memory based on content protection bit information.

FIG. 4 illustrates an aspect method 400 for scrambling protected data within a memory based on a content protection (or CP) bit value. The method 400 is similar to the methods described above, except that a computing device employing the method 400 may cause data within data bus transaction to be scrambled by setting a CP bit value instead of indicating a protected VMID or destination memory address. In an aspect, the computing device may include dedicated pins or connections on the bus to enable protection indicators for various components, such as processors, modems, etc. For example, a modem component may include a dedicated pin that enables data bus transactions from the modem to include a protected CP bit. In another aspect, components having dedicated pins may be configured to selectively set CP bit values for memory scrambling. For example, a component with a dedicated pin for setting protected CP bit values may transmit data bus transaction such that a memory controller may not scramble the transaction data.

In block 304, the computing device may generate data for storage within a storage, or memory, unit. The data may be generated by an application executing on the processor, such as a voice over Internet protocol program. In an aspect, the data may be generated by a component with the computing device, such as a graphics processor, peripheral, or modem. In block 402, the computing device processor may package the data with tagging information for transmission over a bus (e.g., a system bus, a serial bus, etc.). The data may be packaged as a data bus transaction by adding a CP bit value to the data with the CP bit indicating whether the data is protected. In block 208, the computing device may transmit the data bus transaction to a memory controller, such as a DDR controller. In block 404, the memory controller may evaluate the data bus transaction (e.g., identify the protection classification of the data) and, in determination block 212, may determine whether the data is protected based on the CP bit value tagging information. For example, the computing device may determine the data to be protected if the CP bit has a value of '1' or vice versa. If the data is protected (i.e., determination block 212="Yes"), the computing device, via the memory controller, may scramble the data in memory. Alternatively, if the data is not protected as indicated by the CP bit value (i.e., determination block 212="No"), the computing device may not scramble but instead may store the data of the data bus transaction in the clear.

Figure 5:
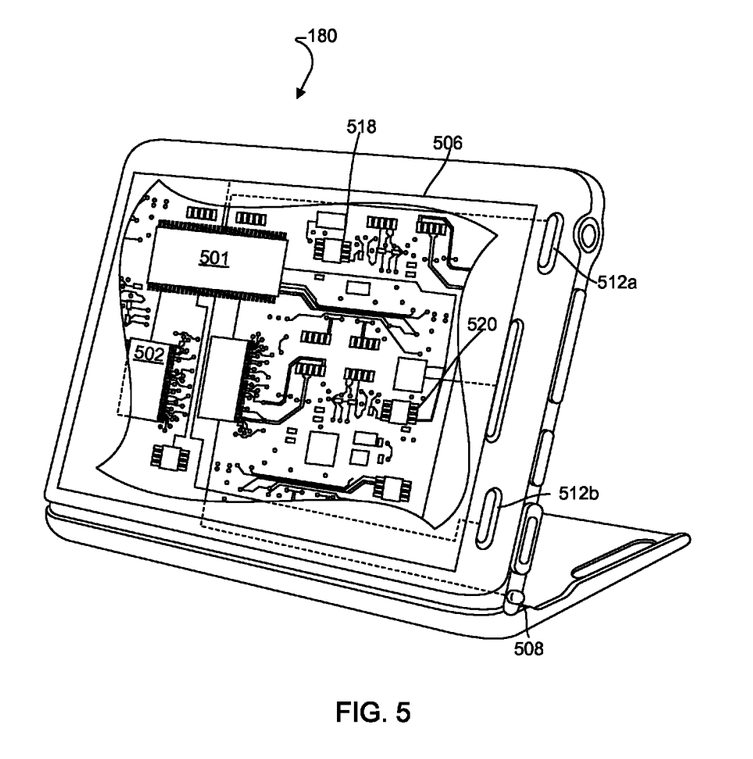
FIG. 5 is a component block diagram of an example wireless mobile computing device suitable for use with the various aspects.

The various aspects may be implemented in any of a variety of mobile computing devices (e.g., smartphones, feature phones, etc.), an example of which is illustrated in FIG. 5. For example, the mobile computing device 180 may include a processor 501 coupled to internal memory 502. The internal memory 502 may be volatile or non-volatile memory, and may also be secure and/or encrypted memory, or unsecure and/or unencrypted memory, or any combination thereof. The processor 501 may also be coupled to a touch screen display 506, such as a resistive-sensing touch screen, capacitive-sensing touch screen infrared sensing touch screen, etc. However, the display of the mobile computing device 180 need not have touch screen capability. The mobile computing device 180 may have one or more short-range radio signal transceivers 518 (e.g., Peanut, Bluetooth®, Zigbee®, RF radio) and antenna 508 for sending and receiving wireless signals as described herein. The transceiver 518 and antenna 508 may be used with the above-mentioned circuitry to implement the various wireless transmission protocol stacks/interfaces. The mobile computing device 180 may include a cellular network wireless modem chip 520 that enables communication via a cellular network. The mobile computing device 180 may also include physical buttons 512a and 512b for receiving user inputs.

Other forms of computing devices, including personal computers and laptop computers, may be used to implementing the various aspects. Such computing devices typically include the components illustrated in FIG. 6 which illustrates an example laptop computer device 110. Many laptop computers include a touch pad touch surface 614 that serves as the computer's pointing device, and thus may receive drag, scroll, and flick gestures similar to those implemented on mobile computing devices equipped with a touch screen display and described above. Such a laptop computer 110 generally includes a processor 601 coupled to volatile internal memory 602 and a large capacity nonvolatile memory, such as a disk drive 606. The laptop computer 110 may also include a compact disc (CD) and/or DVD drive 608 coupled to the processor 601. The laptop computer device 110 may also include a number of connector ports 610 coupled to the processor 601 for establishing data connections or receiving external memory devices, such as a network connection circuit for coupling the processor 601 to a network. The laptop computer device 110 may have one or more short-range radio signal transceivers 618 (e.g., Peanut®, Bluetooth®, Zigbee®, RF radio) and antennas 620 for sending and receiving wireless signals as described herein. The transceivers 618 and antennas 620 may be used with the above-mentioned circuitry to implement the various wireless transmission protocol stacks/interfaces. In a laptop or notebook configuration, the computer housing includes the touch pad 614, the keyboard 612, and the display 616 all coupled to the processor 601. Other configurations of the computing device may include a computer mouse or trackball coupled to the processor (e.g., via a USB input) as are well known, which may also be used in conjunction with the various aspects.

Figure 6:
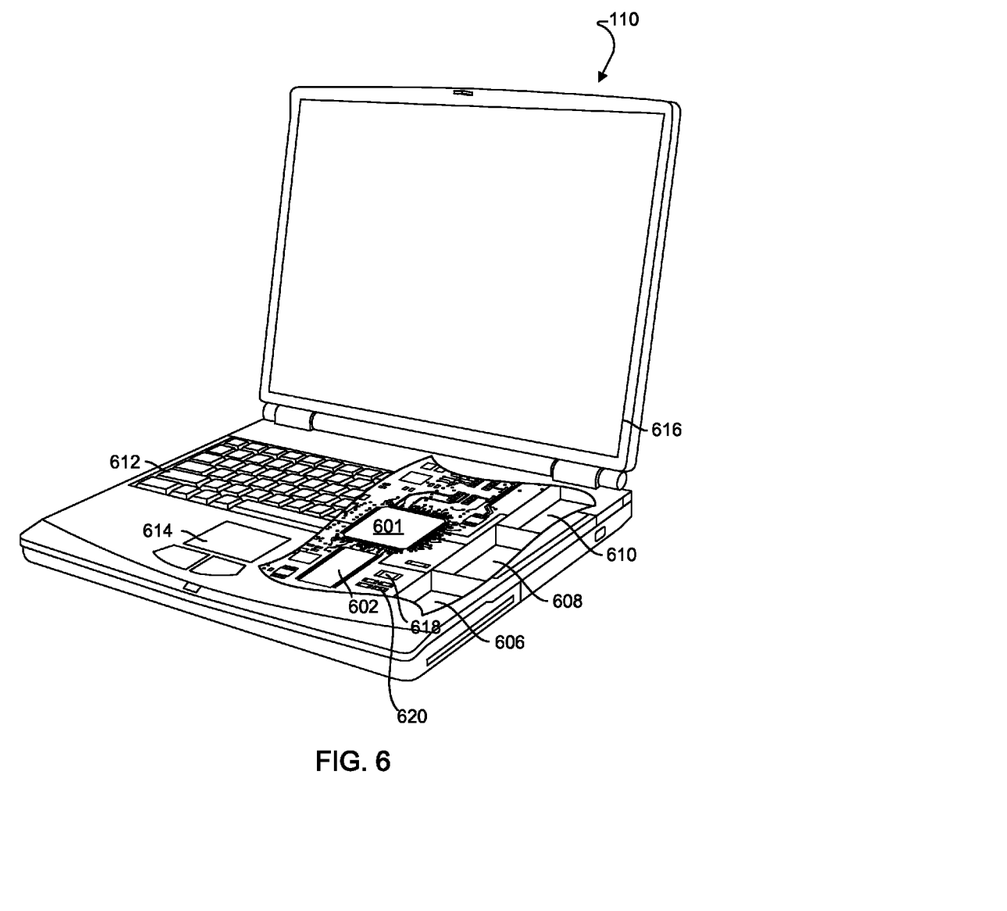
FIG. 6 is a component block diagram of an example laptop computing device suitable for use with the various aspects.

The processors 501 and 601 may be any programmable microprocessor, microcomputer or multiple processor chip or chips that can be configured by software instructions (applications) to perform a variety of functions, including the functions of the various aspects described above. In the various devices, multiple processors may be provided, such as one processor dedicated to wireless communication functions and one processor dedicated to running other applications. Typically, software applications may be stored in the internal memory 502 and 602 before they are accessed and loaded into the processors 501 and 601. The processors 501 and 601 may include internal memory sufficient to store the application software instructions. In many devices the internal memory may be a volatile or nonvolatile memory, such as flash memory, or a mixture of both. For the purposes of this description, a general reference to memory refers to memory accessible by the processors 501 and 601 including internal memory or removable memory plugged into the various devices and memory within the processors 501 and 601.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for selective memory scrambling within a computing device, comprising:
   adding tagging information to data transmitted over a bus of the computing device by a bus master, wherein the tagging information identifies a source of the data, and further wherein the data is to be stored in a memory;
   determining the source of the data based on the tagging information;
   determining whether the data includes protected content based on the source of the data, wherein the memory is partitioned into a first partition and a second partition;
   applying a scrambling routine to the data as part of storing the data in the first partition when the data includes protected content; and
   storing the data in the second partition without applying the scrambling routine to the data when the data does not include protected content.

2. The method of claim 1, wherein protected content is selected from the group of data under digital rights management (DRM), personal information, security information, banking information, passwords, authentication information, protected content application information, and medical data.

3. The method of claim 1, wherein the memory is selected from the group of cache memory, volatile memory, non-volatile memory, and off-chip storage.

4. The method of claim 1, wherein:
   determining the source of the data based on the tagging information comprises comparing the tagging information to stored identifiers correlated to authorized security domains.

5. The method of claim 1, wherein the tagging information comprises a virtual machine identification (VMID).

6. The method of claim 1, wherein the tagging information comprises a bus master identification.

7. The method of claim 1, wherein:
   the tagging information added to the data is a destination memory address, and
   the memory uses particular memory addresses for protected content data.

8. The method of claim 1, wherein the tagging information added to the data is a content protection (CP) bit.

9. The method of claim 1, wherein the method is executed on at least one of a first processor within the computing device, a coprocessor within the computing device, and a peer processor within the computing device.

10. A computing device, comprising:
    a memory configured with at least a secure domain in which data is scrambled and an unsecure domain, wherein the secure domain comprises a first partition of the memory and the unsecure domain comprises a second partition of the memory; and
    a processor coupled to the memory, wherein the processor is configured with processor executable instructions to perform operations comprising:
       adding tagging information to data transmitted over a bus by a bus master, wherein the tagging information identifies a source of the data, and further wherein the data is to be stored in the memory;
       determining the source of the data based on the tagging information;
       determining whether the data includes protected content based on the source of the data;
       applying a scrambling routine to the data as part of storing the data in the first partition of the secure domain when the data includes protected content; and
       storing the data in the second partition of the unsecure domain without applying the scrambling routine to the data when the data does not include protected content.

11. The computing device of claim 10, wherein protected content is selected from the group of data under digital rights management (DRM), personal information, security information, banking information, passwords, authentication information, protected content application information, and medical data.

12. The computing device of claim 10, wherein the memory is selected from the group of cache memory, volatile memory, non-volatile memory, and off-chip storage.

13. The computing device of claim 10, wherein the processor is configured with processor executable instructions to perform operations such that:
    determining the source of the data based on the tagging information comprises comparing the tagging information to stored identifiers correlated to authorized security domains.

14. The computing device of claim 10, wherein the tagging information comprises a virtual machine identification (VMID).

15. The computing device of claim 10, wherein the tagging information comprises a bus master identification.

16. The computing device of claim 10, wherein:
    the tagging information added to the data is a destination storage address, and
    the memory uses particular storage addresses for protected content data.

17. The computing device of claim 10, wherein the tagging information added to the data is a content protection (CP) bit.

18. The computing device of claim 10, wherein the processor is one of a first of a plurality of processors within the computing device, a coprocessor within the computing device, and a peer processor within the computing device.

19. A computing device, comprising:
    a memory configured with at least a secure domain in which data is scrambled and an unsecure domain, wherein the secure domain comprises a first partition of the memory and the unsecure domain comprises a second partition of the memory;

means for adding tagging information to data transmitted over a bus by a bus master, wherein the tagging information identifies a source of the data, and further wherein the data is to be stored in the memory;

means for determining the source of the data based on the tagging information;

means for determining whether the data includes protected content based on the source of the data;

means for means for applying a scrambling routine to the data as part of storing the data in the first partition of the memory when the data includes protected content; and means for storing the data in the second partition of the memory without applying the scrambling routine to the data when the data does not include protected content.

20. The computing device of claim 19, wherein protected content is selected from the group of data under digital rights management (DRM), personal information, security information, banking information, passwords, authentication information, protected content application information, and medical data.

21. The computing device of claim 19, wherein the memory is selected from the group of cache memory, volatile memory, non-volatile memory, and off-chip storage.

22. The computing device of claim 19, wherein:
means for determining the source of the data based on the tagging information comprises means for comparing the tagging information to stored identifiers correlated to authorized security domains.

23. The computing device of claim 19, wherein the tagging information comprises a virtual machine identification (VMID).

24. The computing device of claim 19, wherein the tagging information comprises a bus master identification.

25. The computing device of claim 19, wherein:
the tagging information added to the data is a destination storage address, and
the memory uses particular storage addresses for protected content data.

26. The computing device of claim 19, wherein the tagging information added to the data is a content protection (CP) bit.

27. The computing device of claim 19, further comprising means for executing applications comprising at least one of a first one of a plurality of processors within the computing device, a coprocessor within the computing device, and a peer processor within the computing device.

28. A non-transitory processor-readable storage medium having stored thereon processor-executable instructions configured to cause a processor to perform operations comprising:
adding tagging information to data transmitted over a bus by a bus master, wherein the tagging information identifies a source of the data, and further wherein the data is to be stored in a memory;
determining the source of the data based on the tagging information;
determining whether the data includes protected content based on the source of the data, wherein the memory is partitioned into a first partition and a second partition;
applying a scrambling routine to the data as part of storing the data in the first partition when the data includes protected content; and
storing the data in the second partition without applying the scrambling routine to the data when the data does not include protected content.

29. The non-transitory processor-readable storage medium of claim 28, wherein the stored processor-executable instructions are configured to cause a processor to perform operations such that protected content is selected from the group of data under digital rights management (DRM), personal information, security information, banking information, passwords, authentication information, protected content application information, and medical data.

30. The non-transitory processor-readable storage medium of claim 28, wherein the stored processor-executable instructions are configured to cause a processor to perform operations such that the memory is selected from the group of cache memory, volatile memory, non-volatile memory, and off-chip storage.

31. The non-transitory processor-readable storage medium of claim 28, wherein the stored processor-executable instructions are configured to cause a processor to perform operations such that:
determining the source of the data based on the tagging information comprises comparing the tagging information to stored identifiers correlated to authorized security domains.

32. The non-transitory processor-readable storage medium of claim 28, wherein the tagging information comprises a virtual machine identification (VMID).

33. The non-transitory processor-readable storage medium of claim 28, wherein the tagging information comprises a bus master identification.

34. The non-transitory processor-readable storage medium of claim 28, wherein the stored processor-executable instructions are configured to cause a processor to perform operations such that:
the tagging information added to the data is a destination storage address, and
the memory uses particular storage addresses for protected content data.

35. The non-transitory processor-readable storage medium of claim 28, wherein the tagging information comprises a content protection (CP) bit.

36. The non-transitory processor-readable storage medium of claim 28, wherein the stored processor-executable instructions are configured to be executed by a processor selected from the group of one of a plurality of processors, a coprocessor, and a peer processor.

37. A computing device, comprising:
a memory configured with at least a secure domain in which data is scrambled and an unsecure domain, wherein the secure domain comprises a first partition of the memory and the unsecure domain comprises a second partition of the memory;
a memory controller coupled to the memory; and
a processor coupled to the memory and the memory controller, wherein the processor is configured with processor executable instructions to perform operations comprising:
adding tagging information to data transmitted over a bus of the computing device by a bus master, wherein the tagging information identifies a source of the data, and further wherein the data is to be stored in the memory; and
programming the memory controller to perform operations comprising:
determining the source of the data based on the tagging information;
determining whether the data includes protected content based on the source of the data;

applying a scrambling routine to the data as part of storing the data in the first partition of the secure domain when the data includes protected content; and storing the data in the second partition of the unsecure domain without applying the scrambling routine to the data when the data does not include protected content.

38. The computing device of claim 37, wherein protected content is selected from the group of data under digital rights management (DRM), personal information, security information, banking information, passwords, authentication information, protected content application information, and medical data.

39. The computing device of claim 37, wherein the memory is selected from the group of cache memory, volatile memory, non-volatile memory, and off-chip storage.

40. The computing device of claim 37, wherein the tagging information further includes one of: a virtual machine identification (VMID); a bus master identification; a destination storage address; an identifier of content of the data; and a content protection (CP) bit.

41. A computing device, comprising:
a memory configured with at least a secure domain in which data is scrambled and an unsecure domain, wherein the secure domain comprises a first partition of the memory and the unsecure domain comprises a second partition of the memory;
a memory controller coupled to the memory;
means for adding tagging information to data transmitted over a bus of the computing device by a bus master, wherein the tagging information identifies a source of the data, and further wherein the data is to be stored in the memory; and
means for programming the memory controller to perform operations comprising:
means for determining the source of the data based on the tagging information;
determining whether the data includes protected content based on the source of the data;
applying a scrambling routine to the data as part of storing the data in the first partition of the secure domain when the data includes protected content; and
storing the data in the second partition of the unsecure domain without applying the scrambling routine to the data when the data does not include protected content.

42. The computing device of claim 41, wherein protected content is selected from the group of data under digital rights management (DRM), personal information, security information, banking information, passwords, authentication information, protected content application information, and medical data.

43. The computing device of claim 41, wherein the memory is selected from the group of cache memory, volatile memory, non-volatile memory, and off-chip storage.

44. The computing device of claim 41, wherein the tagging information further includes one of: a virtual machine identification (VMID); a bus master identification; a destination storage address; an identifier of content of the data; and a content protection (CP) bit.

45. A non-transitory processor-readable storage medium having stored thereon processor-executable instructions configured to cause a processor to perform operations comprising:
adding tagging information to data transmitted over a bus of the computing device by a bus master, wherein the tagging information identifies a source of the data, and further wherein the data is to be stored in a memory; and
programming a memory controller to perform operations comprising:
determining the source of the data based on the tagging information;
determining whether the data includes protected content based on the source of the data, wherein the memory is partitioned into a first partition and a second partition;
applying a scrambling routine to the data as part of storing the data in the first partition when the data includes protected content; and
storing the data in the second partition without applying the scrambling routine to the data when the data does not include protected content.

46. The non-transitory processor-readable storage medium of claim 45, wherein the stored processor-executable instructions are configured to cause a processor to perform operations such that protected content is selected from the group of data under digital rights management (DRM), personal information, security information, banking information, passwords, authentication information, protected content application information, and medical data.

47. The non-transitory processor-readable storage medium of claim 45, wherein the stored processor-executable instructions are configured to cause a processor to perform operations such that the tagging information further includes one of: a virtual machine identification (VMID); a bus master identification; a destination storage address; an identifier of content of the data; and a content protection (CP) bit.

* * * * *